Patented June 6, 1950

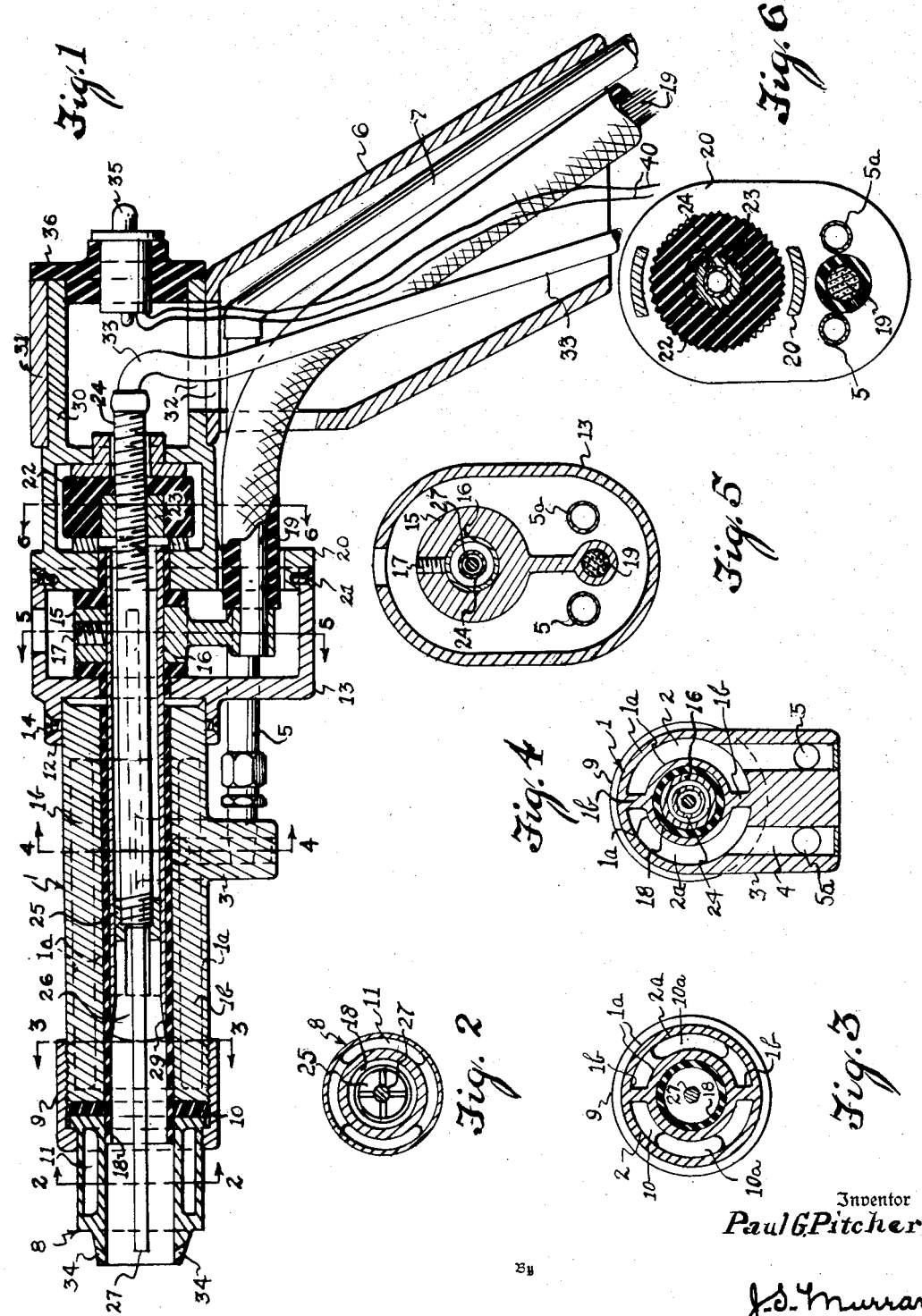

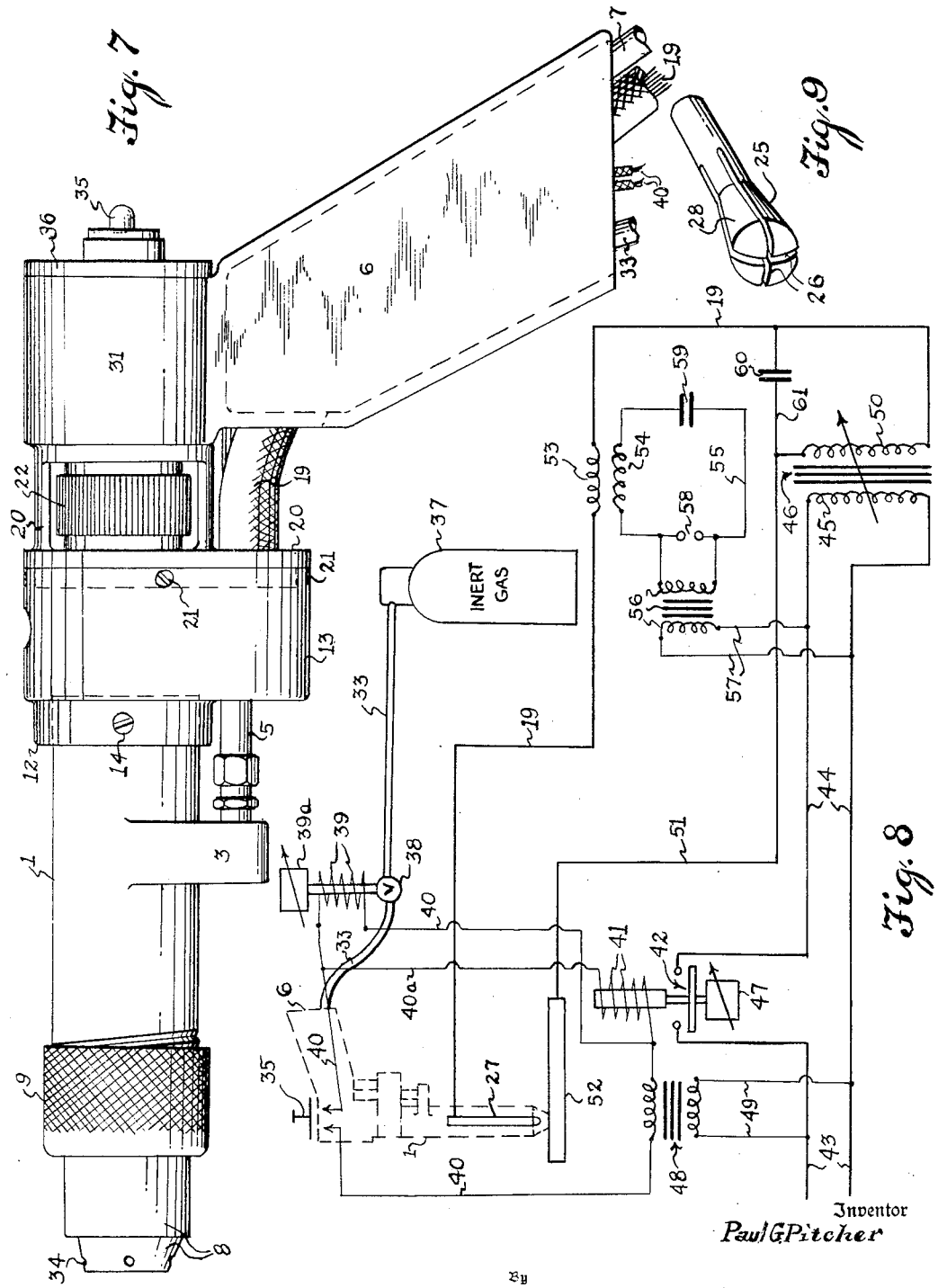

2,510,415

UNITED STATES PATENT OFFICE 2,510,415

WELDING GUN WITH GAS SHIELDED ARC

Paul Gilbert Pitcher, Detroit, Mich., assignor to
Sidney M. Harvey, Detroit, Mich.

Application February 7, 1949, Serial No. 75,000

4 Claims. (Cl. 219—8)

This invention relates to welding guns and particularly guns providing a shield of inert gas for a welding arc.

Objects of the invention are to provide an improved system for water-cooling a gun of the aforementioned type; to provide improved means for clamping or releasing an electrode used in such a gun and for adjusting such electrode to regulate the length of arc; and to provide improved means for delivering an arc-shielding gas to the nose of the gun.

These and various other objects are attained by the construction hereinafter described and illustrated in the accompanying drawings, wherein:

Fig. 1 is a longitudinal axial sectional view of my improved welding gun.

Figs. 2 to 6 inclusive are cross sectional views, corresponding respectively to the respective section lines 2—2, 3—3, 4—4, 5—5, and 6—6, appearing on Fig. 1.

Fig. 7 is a side elevational view of the gun.

Fig. 8 is a diagram exemplifying electrical circuits for producing and controlling the welding arc.

Fig. 9 perspectively illustrates a chuck used in the gun.

In these views, the reference character 1 designates the cylindrical barrel of my improved gun. Such barrel has coaxially spaced peripheral walls 1a, and a pair of diametrically opposed partitions 1b interconnecting such walls and so elongated as to form two water passages 2 and 2a approximately coextensive in length with the barrel. A lug 3 carried as an exterior downward projection on the barrel has parallel water passages 4 transverse to the barrel and respectively communicating with the respective passages 2 and 2a. Water supply and return pipes 5 and 5a, connected with the passages 2 and 2a, extend rearwardly from the lug 3 and into a hollow handle 6 secured to the rear end of the barrel, and flexible hose connections 7 joined to the rear end of said pipes extend through the open lower end of the handle, leading respectively to any suitable supply source and drain (not shown). A work-engaging nose piece 8 is secured to and substantially against the front end of the barrel by a clamping collar 9, a gasket 10 being interposed between the barrel and nose piece for water-sealing purposes, such gasket having openings 10a connecting the passages 2 and 2a with a continuous annular water passage 11 in the nose piece. The latter may be considered a forward extension of the barrel.

The rear end of the barrel is snugly set into a socket extension 12 of a chambered fitting 13, and is secured in such extension by set screws 14. Said fitting houses an electrical connector 15 having an upper aperture snugly receiving the rear portion of a tube 16 of copper or other electrically conductive metal, the connector being clamped to such tube by a screw 17. The tube extends centrally forward in the barrel and is insulated from the latter by a sleeve 18. The connector 15 has a lower aperture wherein is soldered or otherwise fixed the forward end of a high amperage conductor 19, delivering a welding current to the connector. Said conductor, suitably insulated, extends into the handle 6 and downwardly through the open lower end thereof.

Abutting the rear end of the fitting 13 is a second chambered fitting 20, the two fittings being rigidly interconnected by screws 21. The forward portion of the fitting 20 forms a laterally open cage receiving a milled adjusting nut 22 and restraining same from movement other than rotation. Said nut is of insulating material with a central metal bushing 23 receiving the threaded rear end portion of a tubular metal rod 24, so that by rotation of the nut the rod may be shifted forwardly or rearwardly. Said rod extends freely forward within the tube 16 and has its front end secured, as by screw threads, to the rear end of a chuck 25 of flexible jaw or collet type. Thus said chuck is diametrically formed with several radial slots 26 elongated from its front end, and forming radially flexible jaws for clamping a rod electrode 27 extended through an opening at the chuck axis. Such electrode extends forwardly to a point establishing it in a desired arc gap relation to a piece of work (not shown) seating the nose piece 8. The original length of the electrode is such as to afford a desired amount of aggregate longitudinal adjustment in compensation for gradual loss of metal at the arc. Through use of a highly heat-resistant metal, such as tungsten, loss of metal may be minimized. As indicated at 28, the chuck jaws have a frusto-conical enlargement at their forward ends, and they may be flexed inwardly to derive their clamping function by retracting such enlargement into the front end portion of the tube 16. Such end portion has an interior flare, indicated at 29, facilitating inward camming of the jaws. As will now appear, longitudinal adjustment of the tubular rod 24 resulting from rotation of the nut 22 is effective to open or close the chuck by shifting its jaws out of or into camming engagement with the tube 16.

The rear portion of the fitting 20 forms a collar 30 which is press-fitted into a collar 31 rigidly surmounting the handle, thus completing the frame assembly of the gun. Openings 32 in the collars 30 and 31 establish communication between the hollow handle and the inner collar and accommodate a flexible hose 33 attached to the rear end of the tubular rod 24 and passing downwardly through the handle. Such hose delivers an inert gas, such as argon, to and through the rod 24 to the chuck, there being a clearance between the electrode 27 and said rod, adequate for the required gas flow. The gas bypasses the chuck by discharging forwardly through the slots 26, thus entering the nose-piece and filling the chamber thereof. Advantages of shielding a welding arc by an inert gas and thus eliminating relatively active oxygen are well understood by those skilled in the welding art. The nose piece has several lateral outlets 34 for the inert gas and it is preferred to somewhat diverge such outlets to the front face of said piece and thus direct the escaping gas, highly heated by the arc, away from the work.

A push button switch 35, of a normally open type, is carried by the rear end of the gun, preferably at the extended axis of the barrel. Thus such switch is set centrally into an insulating plate 36 which marginally seats against the collar 31 and has a portion inserted in the collar 30. The function of this switch will be presently explained. In the electrical diagram (Fig. 8), the reference character 37 designates a tank for delivering an inert gas to the hose 33. Flow through the hose is controlled by a valve 38, normally closed and adapted to be opened through energization of a solenoid 39 included in a circuit 40. Associated with said valve and solenoid is any ordinary means 39a for effecting a selectively timed delayed closing of the valve. The push button switch 35 serves to close the circuit 40. Shunted across the circuit 40 by a line 40a is the coil 41 of a relay exercising control through a switch 42 of current delivery from a pair of mains 43 to the leads 44 from the primary 45 of a heavy amperage transformer 46. The switch 41 is normally open and has associated therewith any ordinary means 47 for effecting a selectively delayed opening of the switch when it is closed through energization of the relay coil. A relatively small transformer 48 has its primary connected to said mains, as at 49, for inducing a control current in the circuit 40. Current induced in the secondary 50 of the transformer 46 energizes a circuit comprising the conductor 19 leading, as has been described, to the electrode 27, and the conductor 51 leading to a companion electrode 52, usually the work to be welded. To start the welding arc and also stabilize such arc, it is necessary, or at least desirable, to superimpose on the heavy flow of welding current in the circuit 19, 27, 52, 51, 50, a relatively small flow of high frequency current. Thus there is interposed in the conductor 19 the secondary 53 of a high frequency transformer, whereof the primary 54 is in a circuit 55 energized through a suitable transformer 56 to which current is supplied through leads 57 branching from the leads 44. A spark gap 58 and a condenser 59 in the circuit 55 are productive of high frequency oscillations. It is preferred to shunt a condenser 60 in a line 61 between the terminals of secondary 50 to strengthen the welding arc.

In the use of my improved gun, the nose-piece is set against the work, as best appears in Fig. 8, and the push button switch 35 is momentarily closed. Current now flows in the circuit 40 and its shunt 40a, energizing the solenoid 39 and consequently effecting a delivery of inert gas to the nose piece, and further energizing the relay coil 41 to close switch 42 and thus supply current to the main transformer 46. A welding current is hence delivered to the electrodes and the oscillating circuit 55 is energized to superimpose a high frequency current on the welding current. The high frequency current ionizes a path for the arc between the two electrodes, assuring immediate striking of the arc and stabilizing the latter. The timing device 47 having been set to predetermine the duration of the weld, the relay switch 42 opens presently to automatically break the arc, and at the same time or slightly later the gas valve 38 closes. It is preferred to continue the gas flow slightly after breaking of the arc, to expedite cooling of the electrode 27. Immediately on termination of the arc, however, the operator may shift the gun to another spot on the work, and when the push button is again depressed, another welding cycle will be initiated.

The described gun lends itself to rapid production of a series of spot welds, and requires far less operating skill than machines heretofore used for resistance spot welding. In resistance spot welding, the work is commonly shifted by the operator relative to the electrodes, necessitating in most instances far more muscular exertion than is requisite for shifting the described gun from spot to spot. Use of said gun, as compared to resistance welding apparatus, derives a further advantage in that the work need not necessarily have a backing support at the welding point, it being requisite only that the piece or pieces to be welded be held in place firmly enough to resist a light pressure applied to the gun by its operator.

As compared to earlier guns designed for somewhat similar use, the described gun is stronger, more efficiently cooled, more easily assembled, and affords a more convenient and rapid adjustment of the gun electrode. It is to be understood that such adjustment serves two purposes, namely, varying the length of the welding arc according to the thickness and particular nature of the metals to be welded, and compensation for such increase of the arc gap as results from very gradual melting of the gun electrode due to arc-emitted heat.

What I claim is:

1. An arc welding gun comprising an elongated hollow barrel having a front and a rear end and a work-engaging hollow nose piece detachably mounted on and forwardly extending from said front end, a handle for the gun secured to said rear end, an elongated electrode disposed within and lengthwise of the barrel and extending into the nose piece, means for releasably positioning the electrode in the barrel and affording it a lengthwise adjustment, means for delivering an electric welding current to the electrode, means for delivering an arc-shielding inert gas to the nose piece, the barrel being formed with separate coolant delivery and return passages elongated lengthwise of the barrel and extending to its front end, and the nosepiece being formed with a coolant chamber establishing communication between said delivery and return passages, means for supplying a coolant to said delivery passage, and means for discharging the coolant from said return passage.

2. In an arc welding gun as set forth in claim 1, a gasket clamped between the barrel and nose piece, establishing a seal against escape of the coolant, and having openings placing said coolant passages in communication with said coolant chamber.

3. An arc welding gun comprising an elongated barrel having an opening extended between its ends, a frame rigidly mounting the rear end of said barrel and formed with a front, an intermediate, and a rear chamber, a tubular conductor for a welding current set into said opening of the barrel and extending into the front chamber of the frame, an electrical connector in said front chamber having an electrical and mechanical connection to the tubular conductor, means delivering a welding current to said connector, a chuck of a flexible jaw type disposed in said opening and retractable into said tubular conductor to contract the chuck jaws, an electrode extended within said opening through the chuck and adapted to be gripped by the contracted jaws, a control tube for the chuck secured to and rearwardly extending from the chuck and having a threaded portion within said intermediate chamber, an adjusting nut engaging said threaded portion within the intermediate chamber for actuating the control tube forwardly and rearwardly, the intermediate chamber being apertured to give access to said nut, and a flexible duct connected within said rear chamber to the control tube and delivering an inert gas to such tube for delivery through the tube and chuck to the front end of the barrel.

4. In an arc welding gun, the combination with an elongated electrode, of a chuck having flexible jaws for gripping the electrode, a tubular conductor for delivering welding current to the electrode, such conductor having an interiorly chamfered front end for receiving and contracting the chuck jaws, a control tube for the chuck rigidly secured to the chuck and rearwardly extending within the tubular conductor and projecting rearwardly beyond such conductor, means engaging the projecting rear end portion of the control tube for adjusting such tube forwardly and back, means for delivering a welding current to the rear portion of the tubular conductor, and means for delivering an inert gas to the rear end of the control tube for delivery by such tube to the front end of the electrode.

PAUL GILBERT PITCHER.

REFERENCES CITED

The following references are of record in the file of this patent:

UNITED STATES PATENTS

| Number | Name | Date |
|---|---|---|
| 2,014,226 | Catlett | Sept. 10, 1935 |
| 2,360,160 | Pickhaver | Oct. 10, 1944 |
| 2,371,945 | Barbeck | Mar. 20, 1945 |
| 2,468,806 | Pilia | May 3, 1949 |
| 2,468,807 | Herbst | May 3, 1949 |